United States Patent [19]

Kiuchi et al.

[11] 4,155,562
[45] May 22, 1979

[54] SEALING STRUCTURE FOR SLIDING PARTS OF POWDER PARTICLE CONVEYING VALVES

[75] Inventors: Michio Kiuchi, Nagareyama; Takeshi Akao, Noda, both of Japan

[73] Assignee: Kikkomas Shoyu, Co., Ltd., Noda, Japan

[21] Appl. No.: 735,640

[22] Filed: Oct. 26, 1976

[30] Foreign Application Priority Data

Oct. 24, 1975 [JP] Japan .................................. 50-127351

[51] Int. Cl.² ............................................. F16J 15/32
[52] U.S. Cl. ................................... 277/188 R; 418/145
[58] Field of Search .................... 251/314, 16, 17, 332, 251/333; 418/147, 148, 145; 277/188, 188 A, DIG. 6; 222/342

[56] References Cited

U.S. PATENT DOCUMENTS

| | | | |
|---|---|---|---|
| 2,209,578 | 7/1940 | Rainey et al. | 277/216 |
| 2,367,311 | 1/1945 | Reece | 222/342 |
| 2,632,399 | 3/1953 | Hyre | 418/145 |
| 2,644,804 | 7/1953 | Rubin | 277/DIG. 6 |
| 3,831,259 | 8/1974 | Goulas | 277/DIG. 6 |

*Primary Examiner*—Robert I. Smith
*Attorney, Agent, or Firm*—Irving M. Weiner; Pamela S. Austin; Melvin Yedlin

[57] ABSTRACT

A sealing structure including a packing for sealing a sliding part of a valve, such as a rotary or reciprocating valve. The sealing structure is used for connecting together devices having a pressure differential between them and in particular for devices conveying powder particles. The packing of the sealing structure is formed by jointing together a member having a solid lubricating property and a member of substantial mechanical strength.

10 Claims, 8 Drawing Figures

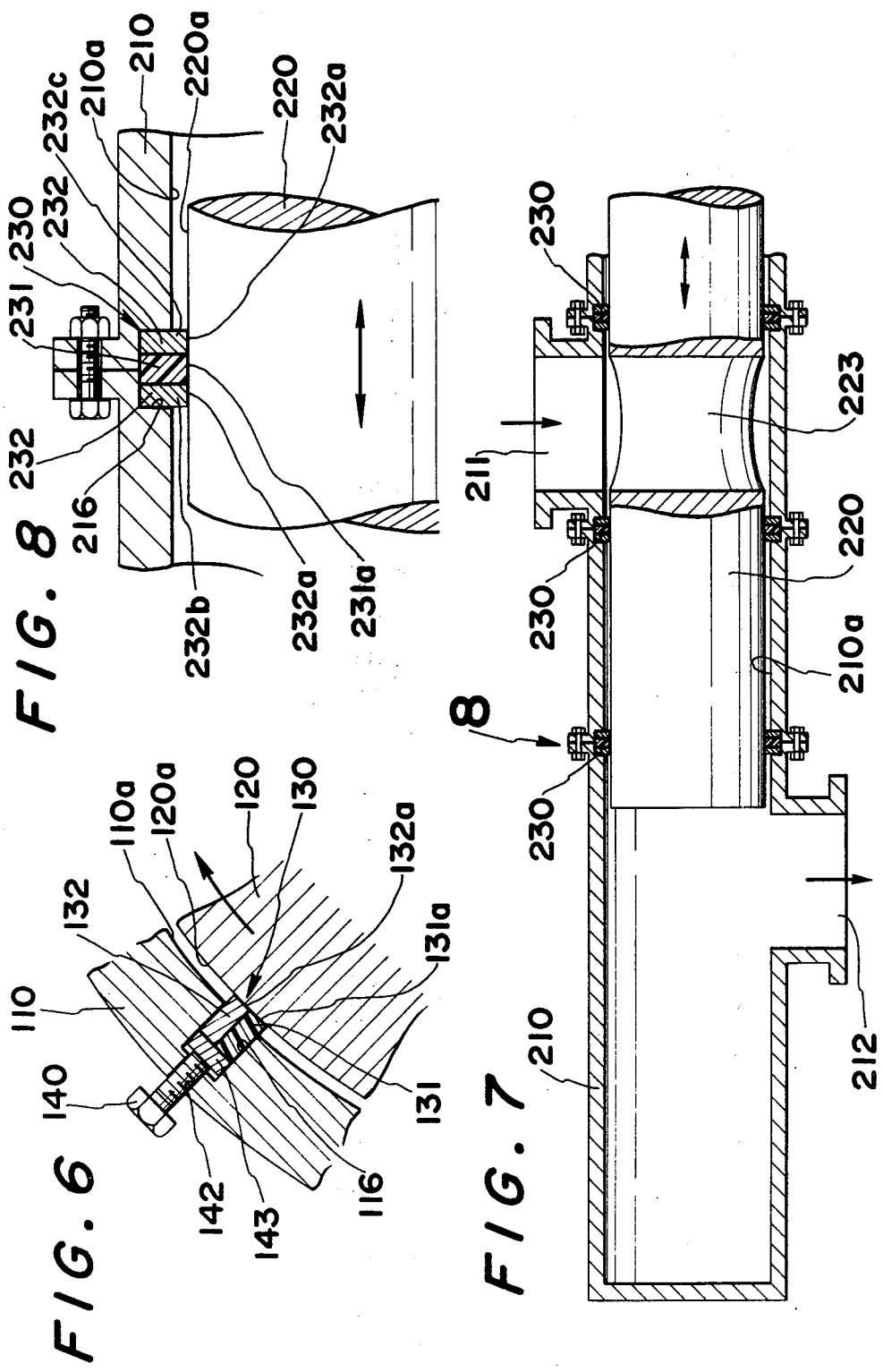

SEALING STRUCTURE FOR SLIDING PARTS OF POWDER PARTICLE CONVEYING VALVES

BACKGROUND OF THE INVENTION

1. Field of the Invention

The present invention relates generally to a sealing structure which includes a packing for sealing a sliding part of a valve for connecting together devices having a pressure differential between them and conveying powder particles such as, for example, a rotary valve or a reciprocating valve.

More particularly, the present invention relates to a sealing structure for sealing a sliding part with a packing which is formed by jointing together a member having a solid lubricating property and a member having substantial mechanical strength, wherein the member having the solid lubricating property is arranged forwardly in the direction in which the packing relatively moves, in order to permit the sliding part to be sealed positively over a wide range.

2. Description of the Prior Art

Generally, the sliding part of a valve to which the present invention is directed is sealed with a packing formed of rubber, nylon, ethylene tetrafluoride, or a soft metal, depending upon the conditions in which the valve is used, such as the temperature, pressure, and powder particle shape, with the packing being provided in the sliding part. However, the sealing means employing such conventional packing is not always satisfactory in its sealing effect, its durability, and the maintenance associated therewith. There are defects in a packing formed of such elastic material. Elastic material such as rubber or nylon, for example, is so low in mechanical strength that it is easily deformed and deterioration of mechanical properties of such material is likely to occur during extreme temperature conditions. Such elastic material is thus likely to have problems in its sealing effect and durability. A metal packing, on the other hand, is so high in frictional resistance as to seize on the sliding surface, and is thus remarkably worn by the damage imparted to the sliding surface. Such a metal packing requires repeated adjustment in response to such wear, and depending on the shape of the conveyed powder particles.

Another type of sealing means which has been employed includes a packing which is pushed out in response to the amount of wear by a solid lubricant being embedded in a metal base. However, such a packing is difficult to conform to the size, shape and material of the device with which it is being employed. Particularly, such a packing provides no appropriate sealing effect for a valve to be used under such conditions as high temperatures, high pressures, and powder particles entering the sliding part.

SUMMARY OF THE INVENTION

In order to effectively solve the problems attendant with the prior art sealing means for the sliding parts of powder particle conveying valves as discussed above, the present invention relates to a packing made by combining a member having a solid lubricating property with a member having substantial mechanical strength to provide an excellent sealing effect which is highly satisfactory both in durability and maintenance.

An object of the present invention is to provide a sealing structure for sealing, with a packing, a sliding part of a valve for connecting devices having a pressure differential between them and conveying powder particles. The packing is formed by jointing together a member having a solid lubricating property and a member having substantial mechanical strength. The member having the solid lubricating property of the packing is arranged forwardly, in the direction in which the packing relatively moves, with both members being provided so as to slide in uniform contact with the sliding surface.

It is therefore an object of the present invention to provide a sealing structure wherein the seal of the sliding surface of a valve consists of a member having a solid lubricating property and a member having substantial mechanical strength, with the two members being jointed together so that both members may recruit each other, and the resultant sealing effect and durability is high.

A further object of the present invention is to provide a sealing structure as above described which is simple in structure, is easily replaced and repaired, and is excellent in maintenance.

The valve to which the present invention is applied is used for connecting devices having a pressure differential between them and conveying powder particles, such as a rotary valve or a reciprocating piston type valve. The packing sealing the sliding part of the valve is made by jointing together a member having a solid lubricating property and a member of substantial mechanical strength.

The member having the solid lubricating property (hereinafter referred to as member A) is provided with a solid lubricating action and is, for example, a phenol resin, acetal resin, nylon, ethylene trifluoride, ethylene tetrafluoride, polyphenylene sulfide, polyimide, polyester resin, or carbon.

The member having substantial mechanical strength (hereinafter referred to as member B) is, for example, rigid cast iron or steel and can be properly selected in response to the respective conditions for usage.

Both the members A and B of the packing are oriented in a special way. The members A and B are positioned in the front and rear, respectively, in the direction in which the packing moves relative to the sliding surface.

The direction in which the packing moves relative to the sliding surface will be the moving direction in case the packing moves, or the reverse direction to the moving direction in case the packing is stationary and the opposed sliding surface moves. Therefore, in case the packing is fitted to the rotor of a rotary valve, the front and rear in the rotating direction of the rotor will be respectively the members A and B. In case the packing is fitted to the casing of the rotary valve, the reverse direction to the rotating direction of the rotor will be the moving direction of the packing, and therefore the front and rear in the rotating direction of the rotor will be occupied by the members B and A, respectively.

In case the packing reciprocates relatively, as in a piston type valve, the members B are arranged to contact the members A on both sides.

It is essential to provide both members A and B so as to slide in uniform contact with the sliding surface. If only the member A is kept in contact with the sliding surface, it will be deformed and broken by the sliding and no sufficient sealing effect will be obtained. Also, if only the member B is kept in contact with the sliding surface, such defects as the seizure on the sliding surface and damage to said surface will be caused. Therefore, it is necessary to slide both members in uniform contact with the sliding surface.

When both members A and B are fitted so as to slide in uniform contact, member A will be prevented by member B jointed behind it from being deformed or broken by the sliding. Further, the dust of the member A worn by the sliding will be deposited on the sliding surface of the member B and will function as a lubricant to prevent the member B from seizing. It is also possible to utilize a part of the valve body as the member B.

Proper means can be adopted to joint both members A and B with each other. For example, they can be jointed by bolts or a binder. The method of fitting the packing to the sliding part is not different from the conventional fitting method. For example, it can be fitted to the front end of a blade through bolts or can be embedded in a groove made in the casing. Also, the packing can be movably fitted to the sliding surface by proper means.

Thus, according to the present invention, a seal with great sealing effect and durability can be made by a simple means of providing a sliding part with a packing made by merely jointing member A and B with each other. Further, a packing of any shape and material depending on the application as mentioned above can be obtained, and a sealing means of very wide application range can be obtained.

BRIEF DESCRIPTION OF THE DRAWINGS

FIG. 6 is a magnified view of the portion indicated by the arrow 6 in FIG. 5.

FIG. 7 is a sectioned side view of another embodiment as applied to a reciprocating piston type valve.

FIG. 8 is a magnified view of the portion indicated by the arrow 8 in FIG. 7.

DETAILED DESCRIPTION

Figure 1:
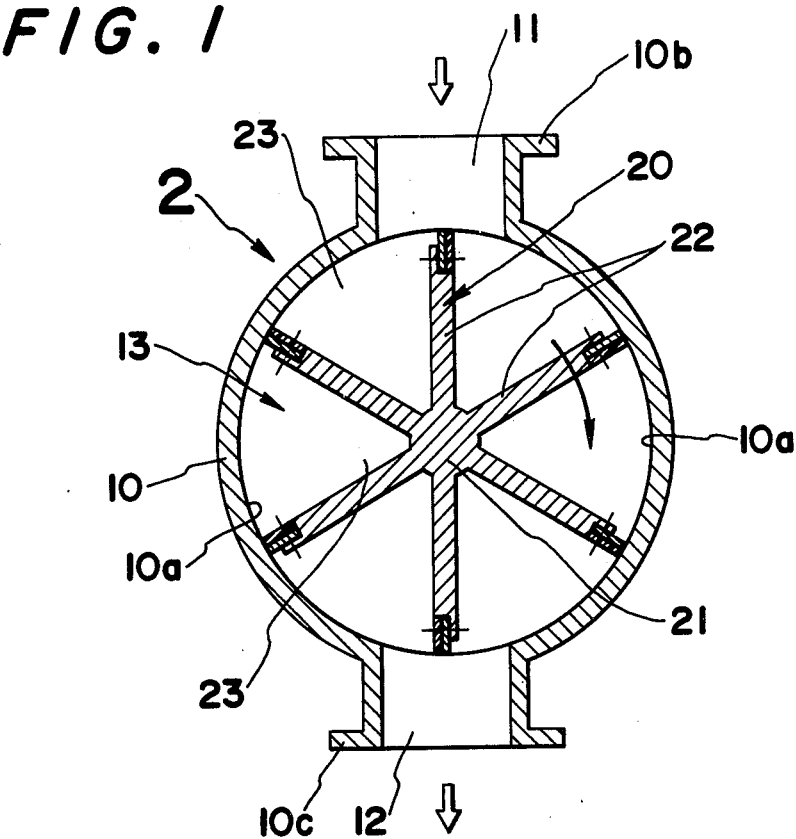
FIG. 1 is a vertical elevation section of the first embodiment as applied to a rotary valve.

FIG. 1 is a vertically sectioned view of a rotary valve in the embodiment as applied to said valve.

A casing 10 of the rotary valve is hollow and has a powder particle inlet 11 opened upwardly in its upper portion, and an outlet 12 opened downwardly in its lower portion. The intermediate portion between inlet 11 and outlet 12 is expanded arcuately and symmetrically outwardly so as to form a part of an arc and to form a circular space 13 communicating with inlet 11 and outlet 12 above and below.

Figure 3:
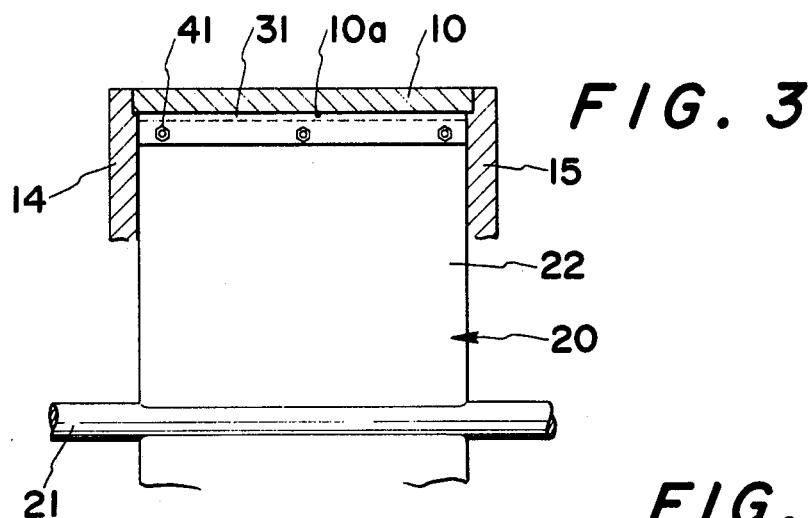
FIG. 3 is a sectioned view on line 3—3 in FIG. 2.

A first valve component, such as a rotor 20, is rotatably borne within the circular space 13 of a second valve component, such as casing 10. As shown in FIG. 3, the shaft 21 of the rotor 20 is supported in the front and rear partition walls 14 and 15 of the casing 10 through bearings, and is connected at one end with a driving device (not shown) so as to be rotated and driven. The rotor 20 is provided with a plurality of blades 22 provided radially on the periphery of the part present in the space 13 of the above mentioned shaft 21. The outer periphery of blade 22 is so formed as to slide in contact with the arcuated inner peripheral walls 10a of the circular space 13 of the casing through a packing 30 which is described in greater detail hereinbelow.

The rotary valve has inlet 11 connected with a pipe line or the like forming a powder particle feeding system through a flange 10b. The outlet 12 is connected with a pipe line or the like forming a system of the next step through a similar flange 10c. The valve has the inlet 11 side as a high pressure side and the outlet 12 side as a low pressure side, and connects devices having a pressure differential between them with each other. Therefore, the pressure reducing holes (not shown) are formed in the right and left arcuated inner peripheral walls 10a. In this rotary valve, powder particles are put into the space 13 through the inlet 11 and are contained in V-shaped pockets 23 formed between blades 22 housed within the space 13. With the rotation of the rotor 20, each pocket containing the powder particles will be sealed by the sliding contact of the front ends of the two blades with the inner peripheral wall 10a, will rotate and convey the powder particles, and will have the pressure reduced in it in a proper position on the inner peripheral wall 10a. With said pocket 23 at a downward rotating angle, the powder particles will be discharged through the outlet 12 and will be sent to the next line side.

Figure 2:
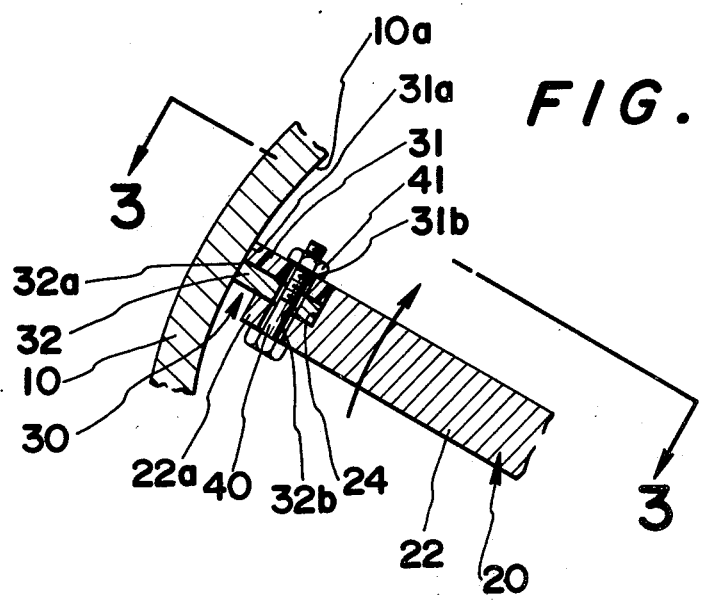
FIG. 2 is a magnified view of the portion indicated by the arrow 2 in FIG. 1.

In the rotary valve, a sealing packing 30 is provided at the front end of each blade 22 sliding in contact with the inner peripheral wall of the casing 10. As shown in FIG. 2, a clearance is formed between the front end 22a of the blade 22 and the inner peripheral wall 10a of the casing 10 so that the front end 22a and the inner peripheral wall 10a may not contact each other. A fitting recess 24 is formed by cutting an L-shaped cut at the front end 22a of the blade in the end surface in the rotating direction of the rotor 20 indicated by the arrow.

A packing 30 to be fitted in this fitting recess 24 consists of a second member A, such as member 31 and a first member B, such as member 32. As shown in FIGS. 2 and 3, each of the members 31 and 32 is made of a horizontally long plate of a length ranging between the front and rear partition walls 14 and 15 of the casing 10. The members 32 and 31 are arranged in the rear and front, respectively, in the rotating direction of the blade 22 and are jointed with each other in juxtaposition. Member 32 is placed on the rear surface on a projection 22b. Bolts 40 are passed through the projection 22b. Member 32 and member 31 are screwed and fastened with nuts 41 to integrally joint the members 31 and 32 with the front end 22a of the blade. The front end surfaces 31a and 32a of the members 31 and 32, respectively, are arranged so as to slide in uniform contact with the inner peripheral wall 10a.

With the rotation in the direction indicated by the arrow in FIG. 2, that is, in the clockwise direction of the rotor 20, the packing 30 provided at the front end of the blade 22 with slide with the respective front end surfaces 31a and 32b of the members 31 and 32 in uniform contact with the inner peripheral wall 10a so as to seal the space between the blades 22 in FIG. 1. In the sliding contact of this packing 30 with the inner peripheral wall 10a, as the member 31 is in the front in the advancing direction and the member 32 is in the rear, the member 31 will be supported on its back surface by the member 32 so as not to be deformed or broken and will thus slide in contact with the inner peripheral wall 10a while retaining the fixed cross-sectional shape to seal the space. The packing 30 will be worn by the repeated sliding contact with the inner peripheral wall 10a. Particularly, the member 31 will be worn faster by the repeated sliding contact than the member 32. However, the wearing dust produced when the member 31 is worn will enter the space between the member 32 in the rear and the inner peripheral wall 10a to act as a lubricant to prevent the member 32 from seizing.

The bolt 40 inserting holes 31b and 32b are set in advance to be larger in diameter than the bolts so that, in case the member 31 is worn, the bolts 40 may be loosened. Then the member 31 may be moved radially outwardly, its front end surface 31a may be contacted with the inner peripheral wall 10a, and then the bolts 40 may be re-tightened. Thus, the contact can be adjusted in response to the wear. In case the wear progresses to exceed this adjusting range, the member 31 may be replaced easily by removing the bolts. In case the member 32 is worn, the same process may be used.

Figure 4:
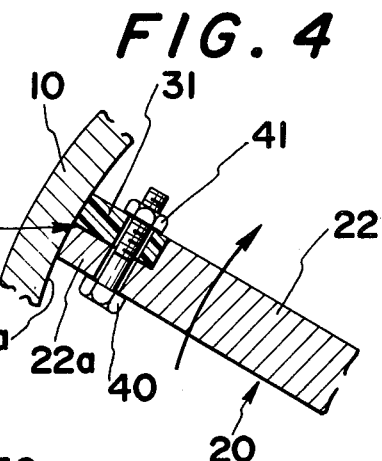
FIG. 4 is the same view as in FIG. 2 showing a modification of the first embodiment.

FIG. 4 shows a modification of the above mentioned embodiment. Here, the front end 22a of each blade 22 is extended so as to be in contact on the front end surface with the inner peripheral wall 10a and has the above mentioned member 31 jointed with it. Both members are integrally jointed with each other by means of bolts 40 and nuts 41. The above mentioned member 32 is not provided, but the front end 22a of the blade 22 is made the second member. In this modification, the contact in accordance with the wear of the member 31 is adjusted in the same manner as described above.

Figure 5:
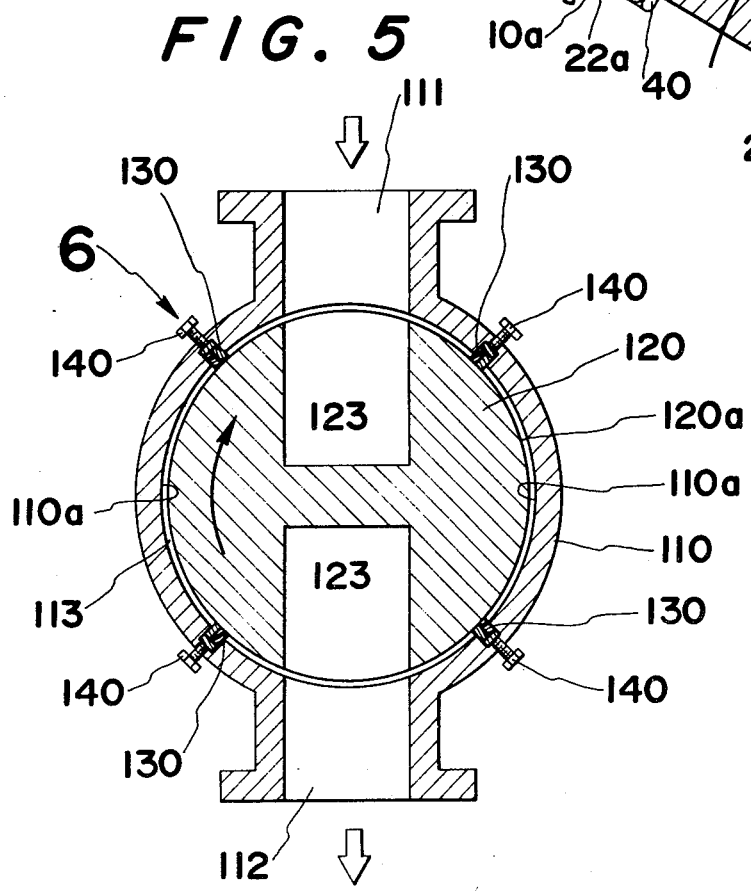
FIG. 5 is the same view as in FIG. 1 of a second embodiment as applied to a rotary valve.

FIGS. 5 and 6 show a rotary valve of the second embodiment.

A first valve component, such as a casing 110, of the valve is provided with an inlet 111 above and an outlet 112 below. The intermediate portion is arcuately expanded on the right and left and is provided with inner peripheral walls 110a forming a part of an arc as the inside walls of a circular space 113. A second valve component, such as a circular rotor 120, is provided within the circular space 113. Concave pockets 123 are made symmetrically in positions displaced by 180° on the periphery of the rotor 120. Powder particles are conveyed from above into the pocket 123 and are conveyed to the system of the next stage through the outlet 112 out of the pocket directed downwardly by the clockwise rotation as indicated by the arrow on the rotor 120.

A packing 130 for this type of rotary valve is provided on the casing 110 side and is stationary. Radially outward concavities 116 are formed in proper positions on the inner peripheral wall 110a of the casing. A plurality, e.g., four in FIG. 5, of such concavities 116 are provided radially at regular angular intervals in the axial direction of the inner peripheral wall 110a.

As shown in FIG. 6, the packing 130 consists of plate-shaped members 131 and 132 and both members 131 and 132 are put together and are fitted and inserted in the concavities 116. The concavity 116 is so formed as to closely fit both members 131 and 132 jointed as put together. Both members 131 and 132 are made integral with each other through a binder or the like. An adjusting plate 143 is inserted in the bottom or the top part of the concavity 116 and the outer wall of the casing. An adjusting bolt 140 is screwed from the outside into screw hole 142, and is in contact at its tip with the adjusting plate 143 so that, when the bolt 140 is screwed and rotated, the packing 130 may advance to the outer peripheral surface 120a of the rotor 120 to adjust the packing when worn.

The front end surfaces 131a and 132a of the respective members 131 and 132 forming the packing 130 are made to slide in uniform contact with the outer peripheral surface 120a of the rotor 120. In case the rotor 120 rotates clockwise, as indicated by the arrow in FIG. 5, the member 131 will be provided in the front in the relative moving direction.

FIGS. 7 and 8 show the third embodiment applied to a piston type valve instead of a rotary valve.

The valve consists of a sectioned horizontal cylindrical casing 210 and a piston 220 reciprocating in the lengthwise direction in the casing. The casing 210 is provided with an inlet 211 in a part of its upper portion, and an outlet 212 in a different position in the lengthwise direction in its lower portion. The piston 220 is provided with a pocket 223 passing vertically through it. Packings 230 are provided between the inlet 211 and outlet 212 on the inner peripheral wall 210a of the casing 210. These packings 230 are provided in the front and rear of the inlet 211 and in the front of the outlet 212 in the lengthwise direction.

The packing 230 is formed to be ring-shaped so as to be fitted and inserted in the base part in a ring-shaped concave groove 216 (FIG. 8) made on the inner peripheral wall 210a, and consists of three members, in contact to the above description because the piston 220 reciprocates forwardly and rearwardly. A member 231 is provided in the middle, members 232 or 232b and 232c are provided to hold it in the front and rear and the three members are integrally jointed together and are made integral by a binder or the like. The front end surfaces 231a and 232a of the respective members 231, 232b and 232c are so provided as to be in uniform contact with the outer periphery 220a of the piston 220.

In this valve, the packing 230 is stationary. With leftward movement of the piston 220, the member 231 in the middle will be the rear and the member 232b on the left will be the front. With rightward movement of the piston 220, the member 231 in the middle will be the rear and the member 232c on the right will be the front, and will act the same as in the above mentioned second embodiment.

We claim:

1. A sealing structure for sealing with a packing first and second valve components of a valve between which components there is relative sliding motion, comprising:
   a first valve component being provided with a sealing packing;
   said sealing packing including a first member and at least one second member, said first and second members being disposed in juxtaposition to each other and joined to each other;
   said second member being formed from a volumed solid lubricative substance having greater lubricity than said first member;
   said first member comprising a rigid, inflexible, solid metal member having greater mechanical strength than said second member;
   each of said first and second members being arranged to slide together as a unit in uniform contact with a relatively sliding surface of said valve; and
   said first and second members being arranged so that they are both in contact with the relatively sliding surface of said valve, and so that said second member forms the leading edge of said sealing packing with respect to said relative motion between said first and second valve components.

2. A sealing structure according to claim 1, wherein:

said sealing packing is removably secured to said first valve component; and said sealing packing is adjustably secured to said first valve component so that said sealing packing may be moved closer to or further from said second valve component.

3. A sealing structure according to claim 1 for sealing with a packing a sliding part of said valve for connecting devices having a pressure difference between them and conveying powder particles, wherein:

said sealing packing is formed by jointing said second member having a solid lubricating property and said first member having a greater mechanical strength with each other; and said second member having the solid lubricating property of said packing is arranged in front in the direction in which said second member having the solid lubricating property of said packing is moved relatively with the sliding surface.

4. A sealing structure according to claim 3, wherein:

said sealing packing is provided on the rotor side of a rotary valve;

said second member having the solid lubricating property and forming part of said packing is arranged in the front in the rotating direction of the rotor; and said first member having the greater mechanical strength is arranged in the rear.

5. A sealing structure according to claim 4, wherein:

the rotor is provided with a plurality of radial blades; and said first and second members are fitted to the front end of each said blade by means of bolts; and said first and second members are advanced to the stationary sliding surface side in response to the wear of the sliding surface with respect to said blade so as to be adjustable.

6. A sealing structure according to claim 4, wherein:

the rotor is provided with a plurality of radial blades; and the front end of said blade is made said first member having a mechanical strength with which said second member having a solid lubricating property is integrally jointed.

7. A sealing structure according to claim 3, wherein:

said sealing packing is provided on the inner peripheral wall of a casing which is the stationary side of a rotary valve; and said second member having the solid lubricating property is arranged in the rear in the rotating direction of the rotor, and said first member having the greater mechanical strength is arranged in the front.

8. A sealing structure according to claim 6, wherein:

said sealing packing is fitted, inserted and contained in the base part of a concavity made in said inner peripheral wall of said casing, and is made advanceable toward the outer periphery of the rotor.

9. A sealing structure according to claim 3, wherein:

said valve comprises a piston-shaped valve reciprocating with respect to a casing;

a plurality of said sealing packings are provided on the inner peripheral wall of the casing which is the stationary side; and each said sealing packing is formed by jointing said first members having the greater mechanical strength on both sides of said second member having the solid lubricating property in the middle.

10. A sealing structure according to claim 9, wherein:

ring-shaped concavities are formed on the inner peripheral wall of the casing;

a ring-shaped sealing packing is fitted and inserted in the base part in each of said concavities; and the inner periphery of the front end of said sealing packing is made to slide in contact with the outer periphery of a piston-shaped valve.

* * * * *